United States Patent [19]
Smith et al.

[11] 3,718,582
[45] Feb. 27, 1973

[54] MICROBIAL BIOLYSIS PROCESS

[76] Inventors: Edmund G. Smith, 206 Watchung Ave., Upper Montclair, N.J. 07043; John W. Hood, 43 John Street, Ridgewood, N.J.

[22] Filed: March 23, 1971

[21] Appl. No.: 127,135

Related U.S. Application Data

[63] Continuation-in-part of Ser. No. 765,243, Oct. 4, 1968, Pat. No. 3,591,491.

[52] U.S. Cl. ..........................210/6, 210/11, 210/12, 210/64, 210/71
[51] Int. Cl................................................C02c 1/06
[58] Field of Search..........................210/2, 5–7, 11, 210/12, 56, 64, 71, 63, 195

[56] References Cited

UNITED STATES PATENTS

| | | | |
|---|---|---|---|
| 3,622,507 | 11/1971 | Pasveer | 210/6 |
| 3,619,420 | 11/1971 | Kemmer et al. | 210/6 |
| 2,477,815 | 8/1949 | Mallory | 210/6 |
| 3,459,303 | 8/1969 | Bradley | 210/195 |

OTHER PUBLICATIONS

Keefer, C. E.: "Sewage Treatments Works," Mc-Graw-Hill, 1st edition, TD 741k3, pp. 354 and 394–400.

*Primary Examiner*—Reuben Friedman
*Assistant Examiner*—Thomas G. Wyse
*Attorney*—Nathaniel L. Leek

[57] ABSTRACT

The method of treating sewage or other biodegradable waste materials in a system including an aerobic process wherein a settleable sludge is formed which comprises returning a part or all of the sludge to a point in advance of the input of the aerobic process and subjecting a selected portion of the returned sludge to heat or vacuum under conditions suitable for the biolysis of the microorganisms in said portion, the portion being selected to meet the food requirements of the active aerobic organisms in the aerobic process. The portion subjected to biolysis is so regulated that substantially all of the biodegradable matter is consumed and only a relatively small quantity of said matter is removed to end disposal.

11 Claims, 4 Drawing Figures

MICROBIAL BIOLYSIS PROCESS

This application is a continuation-in-part of copending application Ser. No. 765,243, filed Oct. 4, 1968, now U.S. Pat. No. 3,591,491.

This invention relates to an improved process and apparatus for the purification of aqueous wastes by biological oxidation, for the purpose of establishing and maintaining optimum efficiency and uniformity of treatment results, in order to produce the maximum abatement of pollution of receiving waters as a steady state condition, and to substantially reduce the mass of solids to be disposed of.

One object of this invention is to provide scientific means of controlling a biological oxidation process.

Another object is to provide new and useful apparatus affording greater process efficiency and economy of operation.

A further object is to provide a method and apparatus for the biological oxidation of aqueous wastes, so that the solid and liquid constituents will separate and compact readily as a steady state condition.

Another object of this invention is to materially reduce the scope, complexity and capital cost of the necessary plant facilities.

More specific objects and advantages will be apparent as the nature of this invention is more fully disclosed.

The wastes to which this invention is applicable include biodegradable wastes such as domestic sewage; paper mill white water; paper mill delignification liquors; food processing and canning; pharmaceuticals; tannery and leather finishing; distilleries; brewery and winery; packing house; abattoir; raw garbage and the like.

In accordance with this invention, scientific control of the Biological Oxidation Process is effected by the application of the principles of Ecological classification of Microscopic Organisms and principles of Biophysics.

Process control problems are basically due to the necessity of producing a constant process efficiency from the numerous variables present in the inflow, such as for example: volume, strength, etc. The inventory of biological population must necessarily be adequate for maximum loading conditions when same occur. For the balance of time, an "underloaded condition" of varying degree exists which adversely affects process values, efficiency and control. For example, wide variations in the inflow are conducive to excessive growth of bacterial colonies resulting in the production of abnormal quantities of solids, accompanied by the undesirable reduction of particle density which precludes the necessary separation of solids and liquid, thereby creating hydraulic problems deleterious to process efficiency and greatly increasing the amount of excess solids deriving from the process. For example, heretofore, controlled application of chlorine to the process has been practiced to effect control of the particle density to be within practical operating limits as measured and determined by the "Sludge Volume Index" i.e., the volume in milliliters occupied by one gram of activated sludge after settling the aerated mixed liquor for 30 minutes $SVI$ = Percent Settling by Volume/Percent Suspended Solids Success and failure have attended this practice. It was found that toxic by-products from the application of chlorine adversely affected the purification process and impaired the results.

Collectively, the foregoing problems are basically due to the uncontrolled variations which occur in the mutual relation between the different microscopic organisms present in the biological population and their environment, i.e., their Ecology.

Reference is made to the works of Kolkwitz and Marsson as contained in "Microscopy of Drinking Water" Chapter 32; G. C. Whipple, John Wiley & Sons, N.Y. Their "Ecological System of Saprobic Organisms" provides us with detailed insight into microbial ecological classification and zones, which more fully explain the foregoing.

In the prior art, recognition of the various operating problems have necessarily resulted in the adoption of empirical process control means. For example, excessive bacterial growth resulting in increasing the mass of solids to be disposed of has been corrected by frequent removal of excess solids from the process. This has proven to be a serious physical and economic factor in the art of waste purification. On the other hand, failure to remove excess solids from the process as required, results in gross stream pollution caused by the involuntary loss of organic solids replete with micro organisms to the receiving waters.

We have discovered that by establishing and maintaining in the aerobic, activated sludge process, an Ecological Classification corresponding to the Mesosaprobic Zone according to Kolkwitz and Marsson, process uniformity and efficiency is obtained. Specifically, this is due to the presence of a heterogeneous microbial population composed of bacteria and ciliated protozoa. The latter are predominantly holozoic and use as food the various complex materials which form the constituents of living organisms and discrete organic particles. The bacteria elaborate enzymes which enable them to remove soluble organic constituents from the aqueous wastes. Excessive bacterial growth causes a departure from this vital Ecological Classification Zone, thereby adversely affecting the growth and activities of the necessary holozoic protozoa resulting in the aforementioned process failure, and in excessive production of solids to be disposed of.

We have discovered that only by establishing and maintaining the aforesaid Ecological Classification that 90–95 percent process efficiency can be achieved as a steady state condition and the excess biodegradable solids resulting from the process are substantially reduced.

We have further discovered that control over the variations in the Ecological Classification could better be effected by Biophysical means such as the controlled application of heat or vacuum to effect biolysis to the degree and extent required, without the production of toxic by-products.

In one embodiment of our invention, heat applied directly or indirectly or vacuum treatment is applied to a controlled portion of the microbial population to effect controlled biolysis in said portion, which portion is then returned to the system. The correct ratio of food to organisms is thereby artificially maintained as a steady state condition, the protozoa readily assimilating the dead organic masses resulting from the biolysis and by means of their oxidative metabolic processes continuously converting this food to the ultimate end products of carbonaceous oxidation, namely carbon dioxide and water.

In accordance with this invention, a microbial biolysis unit consisting of a source of heat or vacuum is interjected into the return sludge circuit, in which a controlled portion of the sludge, after biolysis, is returned to the system. This unit is capable of continuous, uninterrupted service or intermittent service by program control, responsive to process requirements. These process requirements may be ascertained by bench technique analyses or by more sophisticated continuous electronic control means.

The nature of the invention will be better understood by referring to the following descriptions, taken in connection with the accompanying drawings in which a specific embodiment has been set forth for purpose of illustration.

Figure 1:
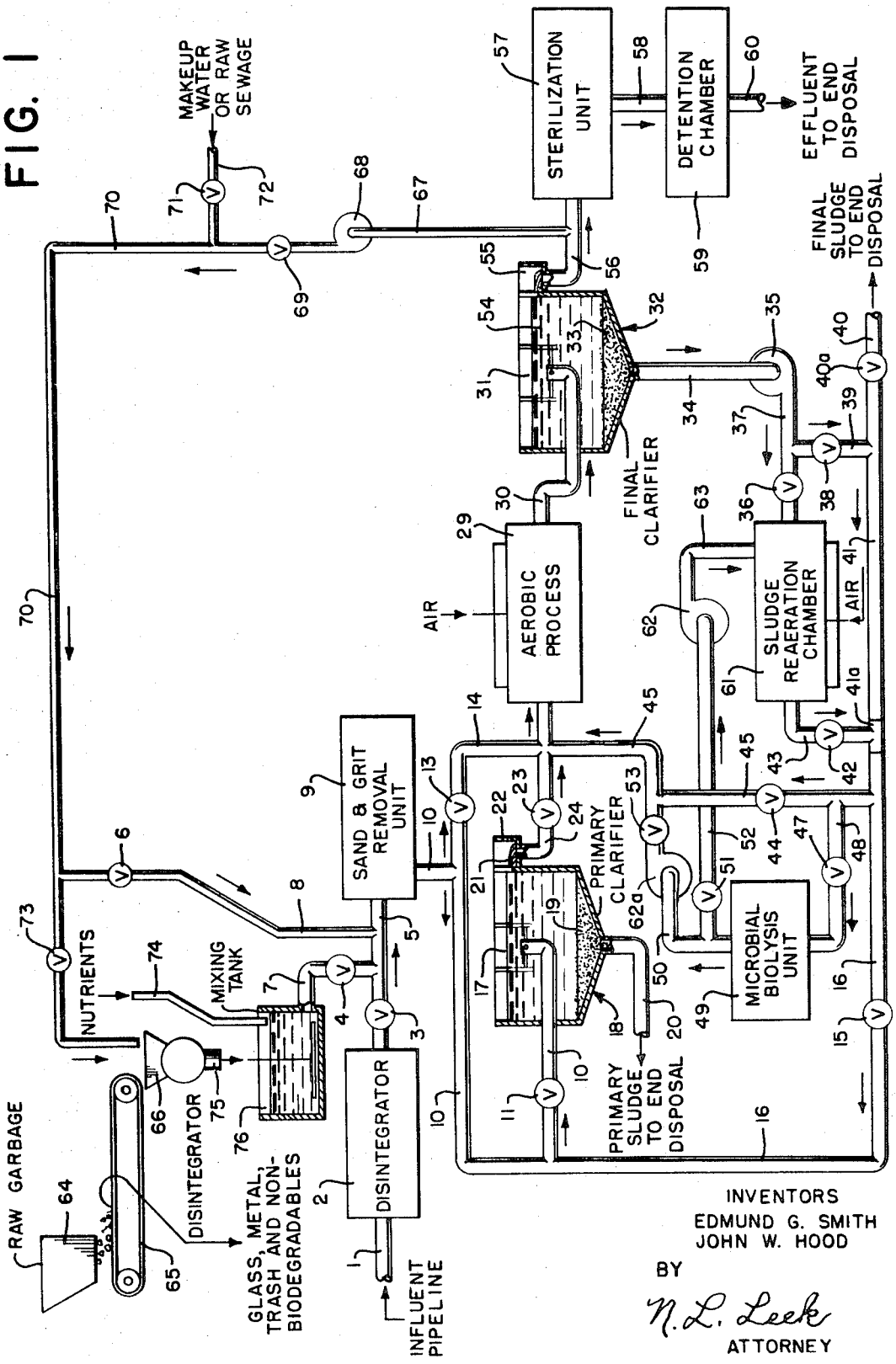
FIG. 1 is a diagrammatic view illustrating the invention as applied to a system for purifying aqueous wastes.

Referring to the drawings more in detail the invention is shown as applied to a purification system for treating sewage, industrial waste or garbage in an aerobic process having a primary and a secondary clarifier and a return for selected portions of the activated sludge. FIG. 1 shows an input pipeline 1 for sewage or industrial waste feeding into a disintegrator 2 wherein the larger constituents are comminuted. A pipeline 5 having a valve 3 leads from the disintegrator to a sand and grit removal unit 9 the output of which is fed through pipeline 10 and valve 11 into influent well 17 of a primary clarifier 18.

Alternatively, raw garbage from hopper 64 is dropped onto trash separation conveyor 65 where glass, metal, trash and nonbiodegradables are removed manually. The conveyor 65 feeds the remainder into disintegrator 66 wherein the material is comminuted, the output of which is fed from output opening 75 to mixing tank 76, the output of which is fed through pipe 7 and valve 4 into the pipe 5 leading to the sand and grit removal unit 9. Water for dilution may be supplied through pipe 72, valve 71 and pipe 70 having regulating valve 73 into the feed hopper of disintegrator 66. Additional diluent may be supplied from pipe 70 through pipe 8 having valve 6 into pipe 5 in advance of the sand and grit removal unit 9. When required, nutrients may be fed through pipe 74 into mixing tank 76.

Primary sludge 19 is removed from the primary clarifier 18 through pipeline 20 to end disposal. The effluent 21 from the primary clarifier overflows into effluent launder 22, thence through pipe 24 having valve 23 to an aerobic process 29 of any desired type. The primary clarifier 18 may be bypassed through pipeline 14 having valve 13 and connecting pipe 10 and pipeline 24 which leads into the aerobic process.

The mixed liquor from the aerobic process containing the secondary solids is carried by pipeline 30 into input well 31 of final clarifier 32 wherein the separable solids are settled out to form a final sludge 33 and a purified effluent 54. The purified effluent 54 overflows into launder 55 and thence through effluent pipeline 56 to sterilization unit 57 of any desired type, thence through pipeline 58 to detention chamber 59 from which it is fed through pipeline 60 to end disposal.

A portion of the effluent from pipeline 56 may be fed through pipe 67, pump 68 and regulating and shut off valve 69 to the pipe 70 for dilution purposes.

The final sludge 33 is removed from the final clarifier 32 through pipe 34 and pump 35, thence through pipe 37 and valve 36 to sludge reaeration chamber 61, thence through pipe 43 and valve 42 to pipe 41. The chamber 61 can be bypassed by pipe 39 and valve 38 interconnecting pipes 37 and 41. The pipe 41 connects through tee 41a and pipe 45 having valve 44 to pipe 24 leading into the aerobic process. The pipe 45 also connects through pipe 48 having valve 47 to the microbial biolysis unit 49 to be described. The output of unit 49 is returned through pipe 50 having valve 53 and pump 62A to the pipe 45 beyond the valve 44. Alternatively, the output of the unit 49 may be fed from pipe 50 through pipe 52 and valve 51 to the input of pump 62, thence through pipe 63 to the input of the sludge reaerating chamber 61.

Tee 41a also connects through pipeline 16 having valve 15 into pipe 10 leading to the input of the primary clarifier 18. The final sludge may be removed to end disposal from pipe 41 through pipe 40 and valve 40a.

We have found that microbial biolysis can be effected by subjecting the biodegradable material to elevated temperatures for a period of time which varies inversely as the temperature and is selected to kill or deactivate the treated material to an extent such that it is suitable for use as food for the active organisms in the aerobic treatment process.

As examples treatment at temperatures of from 140° to 212° F. for periods of time varying from 30 seconds to 5 minutes respectively have been found satisfactory. Treatment at 180° for a period of 1 minute is preferred and has been found to produce effective results.

Figure 2:
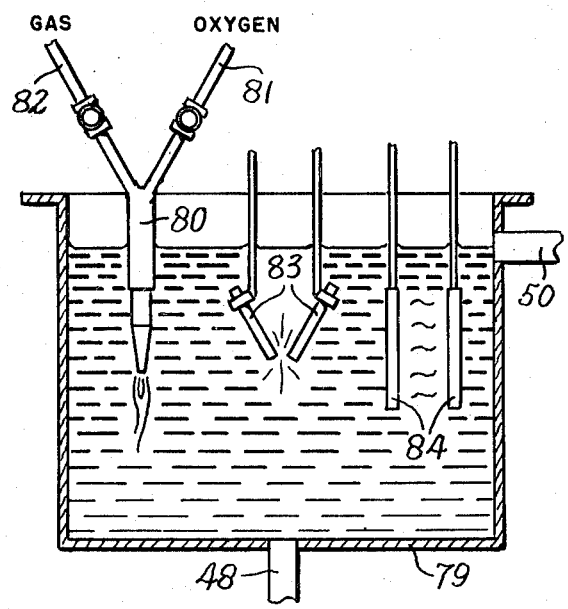
FIG. 2 is a vertical section showing the microbial biolysis unit having means for applying heat directly to the material being treated.

FIG. 2 illustrates one type of apparatus which is suitable for use as the microbial biolysis unit in the system of FIG. 1.

FIG. 2 illustrates a treating tank 79 connected to receive the sludge for treatment from input pipe 48 and to discharge the treated material through outlet pipe 50 as indicated by unit 49 of FIG. 1. The material in the tank 79 is shown as heated by a submerged flame from burner 80 supplied by an oxygen line 81 and a gas pipe 82. The material is held in contact with this submerged flame and circulated in the tank 79 for the time required to effect biolysis.

The submerged flame also may be produced by a submerged arc drawn between electrodes 83. Heat may also be supplied directly by passing electric current between submerged electrodes 84. Any selected one or any desired combination of these heating means may be used according to the requirements in any particular case, and depending upon the capacity of the equipment and the throughput.

Figure 3:
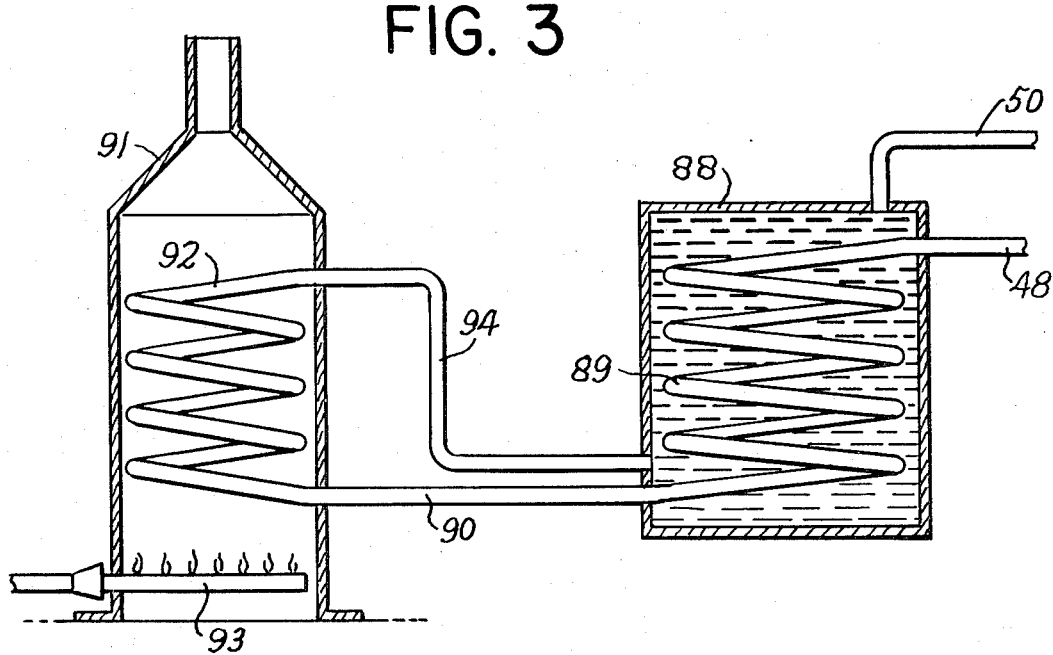
FIG. 3 is a similar sectional view illustrating the use of a heat exchanger for effecting microbial biolysis.

FIG. 3 illustrates the use of a heat exchanger for conserving heat in the above system. In this figure, a heat exchanger 88 includes a heat transfer coil 89 connected to receive the sludge for treatment from the pipe 48 and connected by pipe 90 to feed the preheated sludge to heater 91 having a coil 92 over gas burner 93 and connected by pipe 94 to return the heated sludge to the heat exchanger 88 for heat transfer to the incoming sludge. The treated sludge is then fed to the output line 50 as in FIG. 2. In this embodiment the sludge is maintained in the heater 91 for the time required for biolysis is set forth above.

As an alternate means of effecting biolysis the sludge can be subjected to freezing temperatures for a time to inactivate the microbial content. This can be effected in standard cooling equipment having means for circulating a cooling liquid which may be substituted for the heater 91 of FIG. 3.

Figure 4:
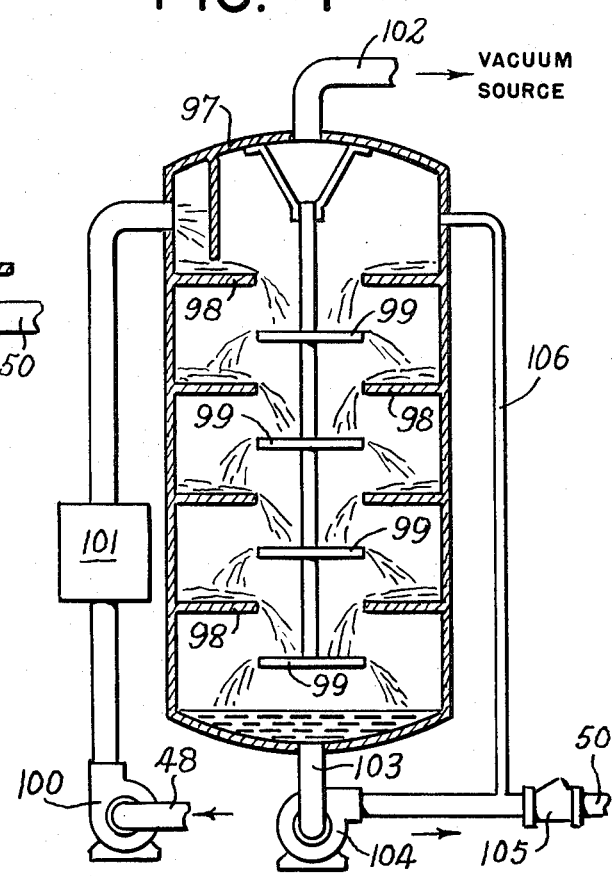
FIG. 4 is a sectional view illustrating the use of vacuum for effecting microbial biolysis.

It has also been found that the cellular structure of the microbial material can be destroyed and the material killed or deactivated by subjecting the same to reduce pressures. FIG. 4 illustrates such an apparatus wherein treating tower 97 is shown as provided with a set of spaced trays 98 and 99. The trays 98 are annular with central openings and the trays 99 are disc-like with peripheral discharge so that liquid flows downwardly over the successive trays in the form of a thin film and is agitated for exposing the liquid to low pressure conditions.

The sludge from the inlet pipe 48 is supplied by a pump 100 through a spring loaded check valve 101 onto the upper tray 98 and, while in the tower 97, is subjected to a vacuum of the order of 28.5 in. of Hg by a pipe 102 from a source of vacuum not shown. The pump 100 may be of the pulsating type and exerts pressure to open the check valve 101 for feeding the sludge into the tower 97. The check valve then closes by spring action to maintain the vacuum within the tower. After flowing in succession over the trays 98 and 99 the treated sludge is discharged through pipe 103, pump 104 and check valve 105 into the line 50 of FIG. 1. The pipeline 106 is provided to vent air or gas back to the tower 97 so that the sludge may enter pump 104 to maintain prime.

While the pressure may vary somewhat, it has been found that a vacuum of the order of 28.5 in. of Hg. for a period of about one minute is effective for deactivation purposes.

In all of the above embodiments, the deactivated material from the biolysis unit is returned to the aerobic process as described in FIG. 1 to serve as food for the active material and a balance is maintained such that a minimum amount of sludge remains for end disposal.

What is claimed is:

1. The method of purifying aqueous waste material containing biodegradable organic matter in a system including an aerobic biological oxidation step wherein a mixed liquor is formed containing purified suspending liquid and biologically active solid matter suspended therein, which comprises separating a sludge containing said biologically active solid matter from said purified suspending liquid whereby said purified suspending liquid constitutes the effluent from the process, removing a portion of said sludge from said system, returning a second portion of said sludge containing biologically active solid matter to said system at a point in advance of said aerobic treatment step for further biological oxidation, separating a third portion of said sludge, heating said third portion to a temperature of from 140 degrees F. to 212 degrees F., maintaining said temperature for a time from 5 minutes to 30 seconds suited to effect non-toxic microbial biolysis of said third portion to an extent such that it is converted to biologically inactive material and made suitable for use as food for the remaining active organisms, returning said third portion after such heat treatment to said aerobic step and controlling the ratio between said portions so as to maintain a predetermined balance between the inactivated biodegradable organic matter which constitutes food for said process and the active organisms in said aerobic treatment step such that the inactivated organisms so returned are substantially consumed by the remaining active organisms with a corresponding reduction in sludge content.

2. The method set forth in claim 1 in which the said third portion is maintained at a temperature of about 180° F. for a period of the order of 1 minute.

3. The method set forth in claim 1 in which the heating is effected by a submerged flame.

4. The method set forth in claim 1 in which the heating is effected by a submerged electric arc.

5. The method set forth in claim 1 in which the heating is effected by passing an electric current through said third portion.

6. The method set forth in claim 1 in which the heating is effected by a heat exchanger in series with a heat source for preheating the third portion by the treated sludge.

7. The method of purifying aqueous waste material containing biodegradable organic matter in a system including an aerobic biological oxidation step wherein a mixed liquor is formed containing purified suspending liquid and biologically active solid matter suspended therein, which comprises separating a sludge containing said biologically active solid matter from said purified suspending liquid whereby said purified suspending liquid constitutes the effluent from the process, removing a portion of said sludge from said system, returning a second portion of said sludge containing biologically active solid matter to said system at a point in advance of said aerobic treatment step for further biological oxidation, separating a third portion of said sludge, effecting non-toxic microbial biolysis of said third portion by subjecting said third portion to a low temperature sufficient to cause freezing, thereby converting the same to biologically inactive material, returning said last material to said aerobic step to constitute food for the remaining active organisms and controlling the ratio between said portions so as to maintain a predetermined balance between the inactivated biodegradable organic matter which constitutes food for said process and the active organisms in said aerobic treatment step such that the inactivated organisms so returned are substantially consumed by the remaining active organisms with a corresponding reduction in sludge content.

8. The method of purifying aqueous waste material containing biodegradable organic matter in a system including an aerobic biological oxidation step wherein a mixed liquor is formed containing purified suspending liquid and biologically active solid matter suspended therein, which comprises separating a sludge containing said biologically active solid matter from said purified suspending liquid whereby said purified suspending liquid constitutes the effluent from the process, removing a portion of said sludge from said system, returning a second portion of said sludge containing biologically active solid matter to said system at a point in advance of said aerobic treatment step for further biological oxidation, separating a third portion of said sludge, effecting non-toxic microbial biolysis of said third portion by subjecting said third portion to a vacuum treatment for converting the same to biologically inactive material, returning said last material to said aerobic step to constitute food for the remaining active organisms and controlling the ratio between said portions so as to maintain a predetermined balance between the inactivated biodegradable organic matter which constitutes food for said process and the active organisms in said aerobic treatment step such that the inactivated organisms so returned are substantially consumed by the remaining active organisms with a corresponding reduction in sludge content.

9. The method set forth in claim 8 in which the vacuum is of the order of 28.5 in. of Hg.

10. The method set forth in claim 9 in which the vacuum treatment is maintained for a period of the order of one minute.

11. The method set forth in claim 8 in which the vacuum treatment is effected by passing the material over a series of trays in an evacuated vessel.

* * * * *